Figure 1:
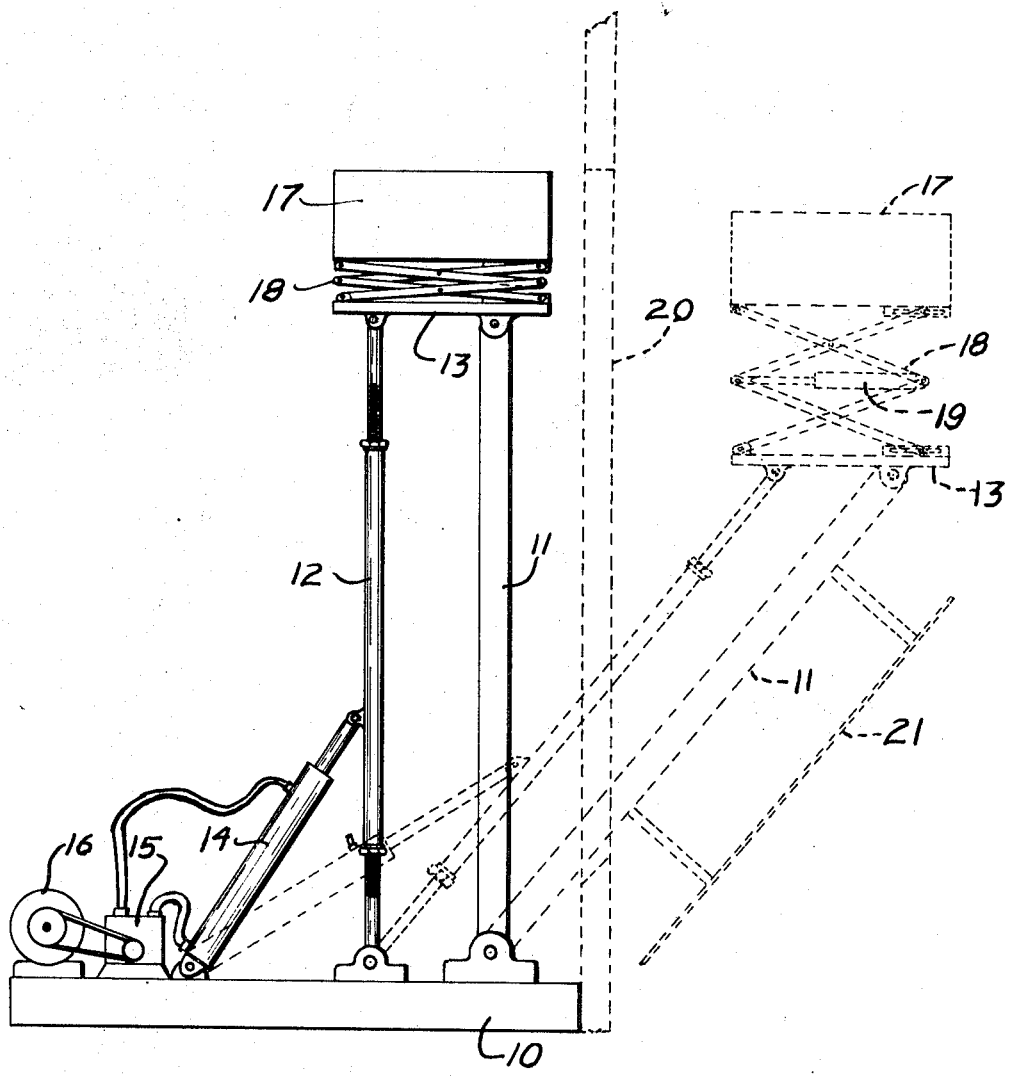

United States Patent

[11] 3,549,086

| [72] | Inventor | Arnold Berkeland<br>708 N. Omaha, Sioux Falls, S. Dak. 57103 |
|---|---|---|
| [21] | Appl. No. | 758,489 |
| [22] | Filed | Sept. 9, 1968 |
| [45] | Patented | Dec. 22, 1970 |

[54] DEAL TRAY AND MOUNTING THEREFOR
2 Claims, 1 Drawing Fig.

[52] U.S. Cl..................................................... 232/44,
248/128
[51] Int. Cl..................................................... E06b 5/10
[50] Field of Search............................................ 232/44,
43.3, 43.4, 43.1, 43.5, 39, 43.2, 45, 1; 248/128,
147, 144, 138, 134, 421

[56] References Cited
UNITED STATES PATENTS

| 806,277 | 12/1905 | McKee......................... | 248/128 |
|---|---|---|---|
| 1,381,837 | 6/1921 | Hopaidaszka................ | 248/421 |
| 1,958,677 | 5/1934 | Phillips........................ | 232/39 |
| 2,914,244 | 11/1959 | Wheeler....................... | 232/44 |
| 3,021,996 | 2/1962 | Ranney........................ | 232/39 |
| 3,059,840 | 10/1962 | Graber et al................. | 232/44 |
| 3,236,556 | 2/1966 | Lathers........................ | 248/421 |

Primary Examiner—Francis K. Zugel
Attorney—Lucas J. DeKoster

ABSTRACT: A deal tray for service from a fixed building to an automobile. The tray is mounted on a parallelogram linkage, which is power operated to extend and retract the tray. A lift may be provided to accommodate cars having windows of differing height from the ground.

PATENTED DEC 22 1970

3,549,086

ARNOLD BERKELAND
INVENTOR.

BY Lucas J. O'Keefe
HIS ATT'Y

DEAL TRAY AND MOUNTING THEREFOR

Deal trays are commonly used in "drive up windows" at banks or other commercial savings institutions. They are also usable for similar facilities for beverage sales and the like. Presently nearly all such trays are slidably mounted to slide from the window toward the customer. The extension of such a slide has caused considerable difficulty with breakdowns because of the long extension required which results in a need for an extremely strong mechanism.

By my device I provide a novel mounting for such a tray which is substantially stronger than the slide mounting. Also I provide means by which the vertical height of the tray may be adjusted to account for the difference in height above ground of the windows of various cars, or pickup trucks.

A more complete understanding of my device in its embodiment may be had from a study of the following specification and the figure in which:

FIG. 1 is a side elevational view of my device, in part diagrammatic

Briefly my invention comprises a deal tray mounted on a pivotal parallelogram linkage and having an extension device operated hydraulically.

More specifically, and referring to the figures, I provide for mounting the mechanism on a base 10. Pivotally mounted on this base are two support struts. In the embodiment shown, the front strut 11 is shown as of fixed length and the rear strut 12 is adjustable. It will be apparent that both could be adjustable or both fixed depending on the installation. The arrangement shown will allow some adjustment in the tilt of the platform 13.

The platform 13 is pivotally mounted on the struts as shown. Thus the platform and the base combined with the two struts form a parallelogram linkage in which the supporting means composed of the struts can be moved back and forth with the platform always being held substantially parallel to the base.

Means to provide the motion is shown to be a hydraulic cylinder and piston assembly 14. This mechanism should be reversible so that it can be either extended or retracted. Power may be supplied from a pump 15 driven by a motor 16 shown diagrammatically in the drawing. Controls (not shown) under the control of the operator must be provided as is well known in the art.

In order to allow wider use of my device I propose to use a lift adapted to lift the tray 17 off the platform so that it can be built to meet the window of the smaller cars and still be usable to meet the window height of a pickup truck or the like. This can be readily accomplished by use of a "lazy tongs" mechanism 18 as shown. Operation of the device can also be hydraulic through the use of a cylinder piston mechanism 19. Controls again can be provided within reach of the operator.

Suitable closures for the opening in the wall 20 may be provided. For example a false wall 21 may be mounted on the front strut 11 to close the opening through which that strut passes. Other closures are well within the ability of those skilled in the art.

Having thus described my invention in its embodiment, I am aware that numerous and extensive departures may be made therefrom without departing from the spirit and scope of the invention as limited only by the following claims:

I claim:

1. A deal tray for extending through a wall opening comprising base means, platform means adjacent said opening, support means pivotally connected between said platform means and said base means, said support means including at least two substantially parallel links, controlled power operated means to cause said links to move to extend said platform means, container means mounted on said platform means, means for mounting said container means engaged between said platform means and said container means whereby said container may be raised relative to said platform means, and false wall means mounted on at least one of said links adapted to close said opening when said links are in a retracted position.

2. The device of claim 1 in which said means for mounting the container includes a lazy tongs mechanism engaged between said platform and said container, remotely controlled power means connected to said tongs mechanism to cause it to move said container away from and back toward said platform.